(12) United States Patent
Reidenbach

(10) Patent No.: US 8,238,557 B2
(45) Date of Patent: Aug. 7, 2012

(54) METHOD AND APPARATUS FOR KEY EXPANSION TO ENCODE DATA

(75) Inventor: Bruce Edward Reidenbach, Albion, IN (US)

(73) Assignee: Exelis Inc., McLean, VA (US)

( * ) Notice: Subject to any disclaimer, the term of this patent is extended or adjusted under 35 U.S.C. 154(b) by 485 days.

(21) Appl. No.: 12/335,837

(22) Filed: Dec. 16, 2008

(65) Prior Publication Data

US 2010/0150350 A1 Jun. 17, 2010

(51) Int. Cl.
*H04L 9/00* (2006.01)

(52) U.S. Cl. ............. 380/277; 380/28; 380/29; 380/44; 713/189; 713/192

(58) Field of Classification Search ............... 380/28, 380/29, 277, 44; 713/189, 192
See application file for complete search history.

(56) References Cited

U.S. PATENT DOCUMENTS

2009/0052659 A1* 2/2009 Gueron et al. ................ 380/29

OTHER PUBLICATIONS

European Search Reported dated Apr. 1, 2010, 8 pages.
Aigner et al., "A Highly Regular and Scalable AES Hardware Architecture", IEEE Transactions on Computers, vol. 52, No. 4, Apr. 2003, pp. 483-491.
Pramstaller et al., Efficient AES Implementations on ASIC's and FPGAs, Advanced Encryption Standard A AES, Springer-Verlag, Berlin, Jul. 31, 2005, pp. 98-112.
Chin-Peng et al., "Implementations of High Throughout Sequential and Fully Pipelined AES Processors on FPGA", Intelligent Signal Processing and Communication Systems, 2007 IEEE, pp. 353-356.
Farhan et al., "An 8-bit Systolic AES Architecture for Moderate Data Rate Applications", Microprocessors and Microsystems, IPC Business Press Ltd., London, vol. 33, No. 3, May 1, 2009, pp. 221-231.

* cited by examiner

*Primary Examiner* — Edward Zee
*Assistant Examiner* — Baotran N To
(74) *Attorney, Agent, or Firm* — Edell, Shapiro & Finnan, LLC

(57) ABSTRACT

An encoder according to the present invention embodiments employs a key expansion module to expand an encryption key by using logic and available clock cycles of an encryption process or loop. The key expansion module generates control signals to enable key expansion data to be injected at appropriate times into the encryption loop (e.g., during available clock cycles of the encryption loop) to perform the key expansion, thereby utilizing the resources of the encryption loop for key expansion. The key expansion module dynamically accounts for varying key lengths, and enables the encryption loop to combine the data being encrypted with proper portions of the expanded key. The use of encryption logic and available clock cycles of the encryption loop for the key expansion reduces the area needed by the encoder on a chip and enhances encoder throughput.

20 Claims, 6 Drawing Sheets

METHOD AND APPARATUS FOR KEY EXPANSION TO ENCODE DATA

BACKGROUND

1. Technical Field

The present invention embodiments pertain to data encoding or encryption. In particular, the present invention embodiments pertain to expansion of keys for data encryption by using logic modules and available clock cycles of a data encryption process or loop to enhance throughput and reduce space for a data encoder on a chip.

2. Discussion of Related Art

The Advanced Encryption Standard (AES) algorithm is a block cipher type of encoding that has been accepted as an encryption standard. AES includes a fixed data block size of 128 bits (e.g., or 16 bytes (128 bits/8 bits per byte)) and key sizes of 128, 192 or 256 bits, where the algorithm operates on an array of bytes arranged into four rows by four columns. A series of processing activities are repeated to form rounds of keyed transformations between input data and the resulting encoded or encrypted data. Specifically, each byte in the array is initially substituted with data from a look-up table, and the array rows are cyclically shifted left by an offset. The first row of the array remains unchanged, while an offset is applied to shift the bytes within the remaining array rows. The four bytes of each column are subsequently multiplied with a fixed polynomial or function, and a subkey for each round (derived from a main key) is combined by an XOR operation with the array (i.e., each byte of the array is combined with a corresponding byte of the subkey) to produce resulting data for the round. This process is repeated for subsequent rounds utilizing the resulting data from a previous round. In the event of a final round, the resulting data from the final round serves as the final encoded data.

In the AES algorithm, a key of 128, 192, or 256 bits is used to create an encrypted 128-bit cyphertext data packet from a 128-bit plaintext value. A set of operations is applied to the data for a number of rounds that is determined by the key length, where: 10 rounds are provided for a 128-bit key; 12 rounds are provided for a 192-bit key; and 14 rounds are provided for a 256-bit key. Each round applies unique key data to the intermediate data value determined for that round. In addition, the key data is applied to the plaintext input prior to the start of the encryption algorithm. Since the key length is substantially shorter than the total amount of unique key data that needs to be applied, the key data has to be expanded. This expansion produces 1408, 1664, or 1920 bits of unique key data for the 128, 192, or 256-bit key. The key expansion algorithm consists of byte rotation, byte substitution, and Galois multiplication by a round constant.

The expanded key is currently provided by either loading the pre-expanded key (computed offline) into the AES algorithm, or by expanding the key each time the AES algorithm is performed using dedicated key expansion logic. In both of these cases, the amount of digital logic needed to implement the AES algorithm is sub-optimal. In the case where a pre-expanded key is used, the data storage for the key increases dramatically from approximately seven and one-half to eleven times the number of storage elements required for a key expanded with each execution of the scheme. By way of example, a 128-bit key requires 1408 bits of an expanded key (i.e., eleven times the number of storage elements for the 128 bit key). Further, expansion of the key with each performance of the scheme requires additional logic resources to compute the expanded key.

SUMMARY

According to the present invention embodiments, an encoder employs a key expansion module to expand an encryption key by using logic and available clock cycles of an encryption process or loop. The key expansion module generates control signals to enable key expansion data to be injected at appropriate times into the encryption loop (e.g., during available clock cycles of the encryption loop) to perform the key expansion, thereby utilizing the resources of the encryption loop for key expansion. The key expansion module dynamically accounts for varying key lengths, and enables the encryption loop to combine the data being encrypted with proper portions of the expanded key. The use of encryption logic and available clock cycles of the encryption loop for the key expansion reduces the area needed by the encoder on a chip and enhances encoder throughput.

The above and still further features and advantages of the present invention embodiments will become apparent upon consideration of the following detailed description of example embodiments thereof, particularly when taken in conjunction with the accompanying drawings wherein like reference numerals in the various figures are utilized to designate like components.

DETAILED DESCRIPTION OF EXAMPLE EMBODIMENTS

Figure 1:
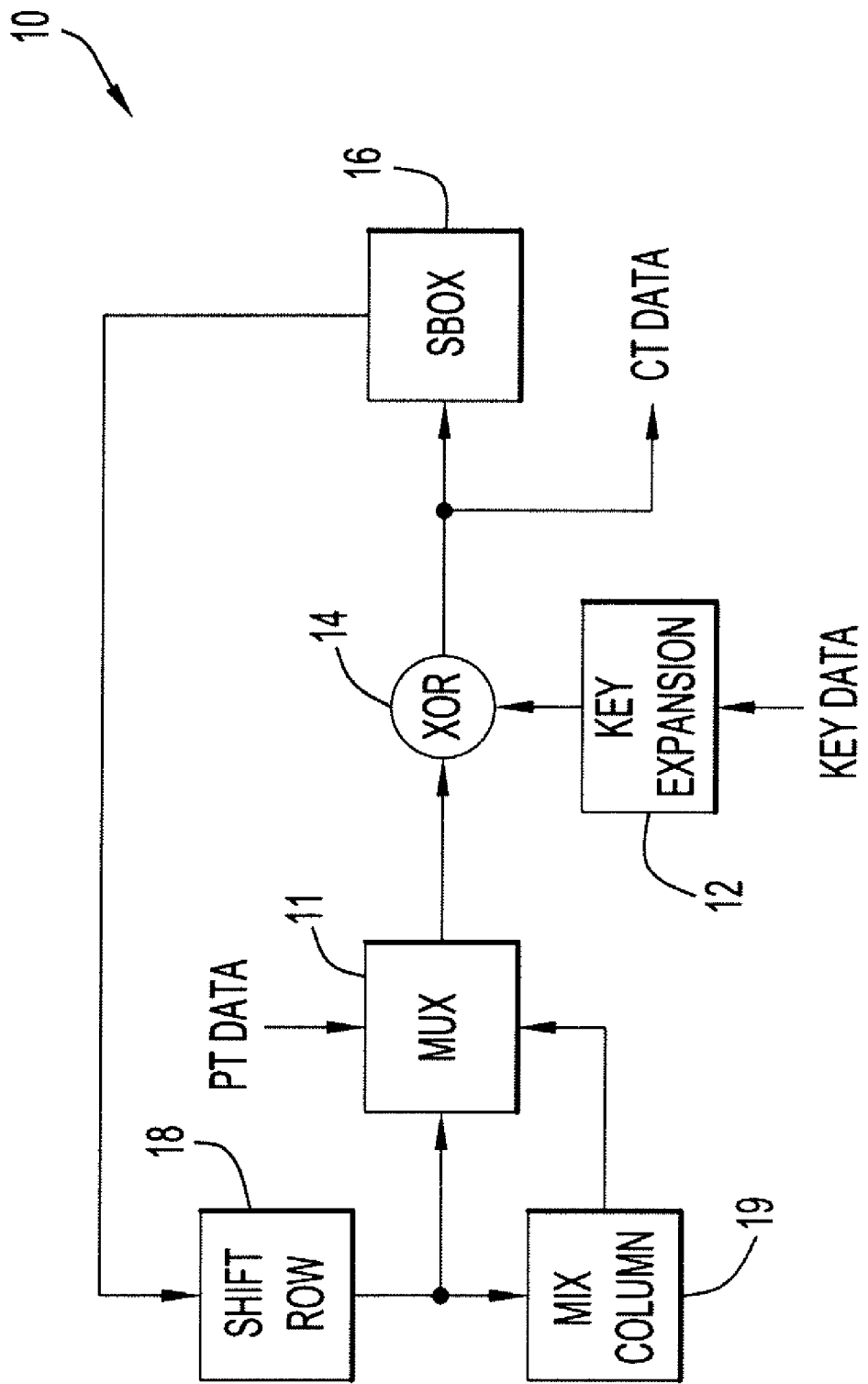
FIG. 1 is a block diagram of an example encoder encrypting data according to an AES encryption scheme.

The present invention embodiments are directed toward an encoder that employs a key expansion module to expand an encryption key by using logic and available clock cycles of an encryption process or loop. An example encoder encrypting data according to the Advanced Encryption Standard (AES) scheme is illustrated in FIG. 1. Specifically, encoder 10 includes a multiplexer module 1 (e.g., MUX as viewed in FIG. 1), a key expansion module 12, a logic module 14 (e.g., XOR as viewed in FIG. 1), a substitution module 16 (e.g., SBOX as viewed in FIG. 1), a shift module 18 (e.g., SHIFT ROW as viewed in FIG. 1), and a mix module 19 (e.g., MIX COLUMN as viewed in FIG. 1). The AES scheme operates on an array of bytes arranged into four rows by four columns, where a series of processing activities are repeated to form rounds of keyed transformations between input data and the resulting encoded data.

Plaintext or input data (e.g., PT DATA as viewed in FIG. 1) is provided to multiplexer module 1 in the form of a 128-bit data block, preferably processed as an array of bytes including four rows by four columns. The multiplexer module is further coupled to shift module 18 and mix module 19, and selects the appropriate data for transference to logic module 14 in accordance with control signals generated by the encoder. Multiplexer module 1 is coupled to logic module 14, and provides the various data to the logic module based on the particular round of the encryption scheme. For example, the input data is provided to logic module 14 for the initial round, data from shift module 18 is provided to the logic module for the final round, and data from mix module 19 is provided to the logic module for intermediate rounds. Since the input data is utilized for the initial round of processing, multiplexer module 1 initially selects the input data for transference to logic module 14. The logic module is further coupled to key expansion module 12 that expands the encryption key to a desired length and provides the appropriate key portion to the logic module. The logic module multiplies (e.g., via one or more exclusive OR (XOR) operations) the input data by the expanded key portion from key expansion module 12.

Substitution module 16 is coupled to logic module 14, where the result from the logic module is applied to substitution module 16. The substitution module includes a look-up table and performs a byte substitution transformation, where each byte of the result from logic module 14 is substituted with data from the look-up table. Shift module 18 is coupled to substitution module 16 and mix module 19, receives the transformed data from the substitution module, and cyclically shifts that data by an offset. For example, the array rows are cyclically shifted left by an offset, where the first row of the array remains unchanged, while the offset is applied to shift the bytes within the remaining array rows.

During initial and intermediate rounds, the shifted data from shift module 18 is provided to mix module 19 that multiplies four bytes of each column of the shifted data with a fixed polynomial or function. The resulting data for the round is provided to multiplexer module 11 for transference to logic module 14 to initiate the next round, where the logic module applies the subsequent portion of the expanded key from key expansion module 12. The encryption process or loop is repeated for each of the remaining intermediate rounds utilizing the data from the prior round. During the final round, mix module 19 is bypassed, and the shifted data from shift module 18 for that round is provided through multiplexer module 11 to logic module 14. The logic module applies the proper portion of the expanded key from key expansion module 12 as described above, where the resulting data is provided as the cyphertext result (e.g., CT DATA as viewed in FIG. 1).

Figure 2:
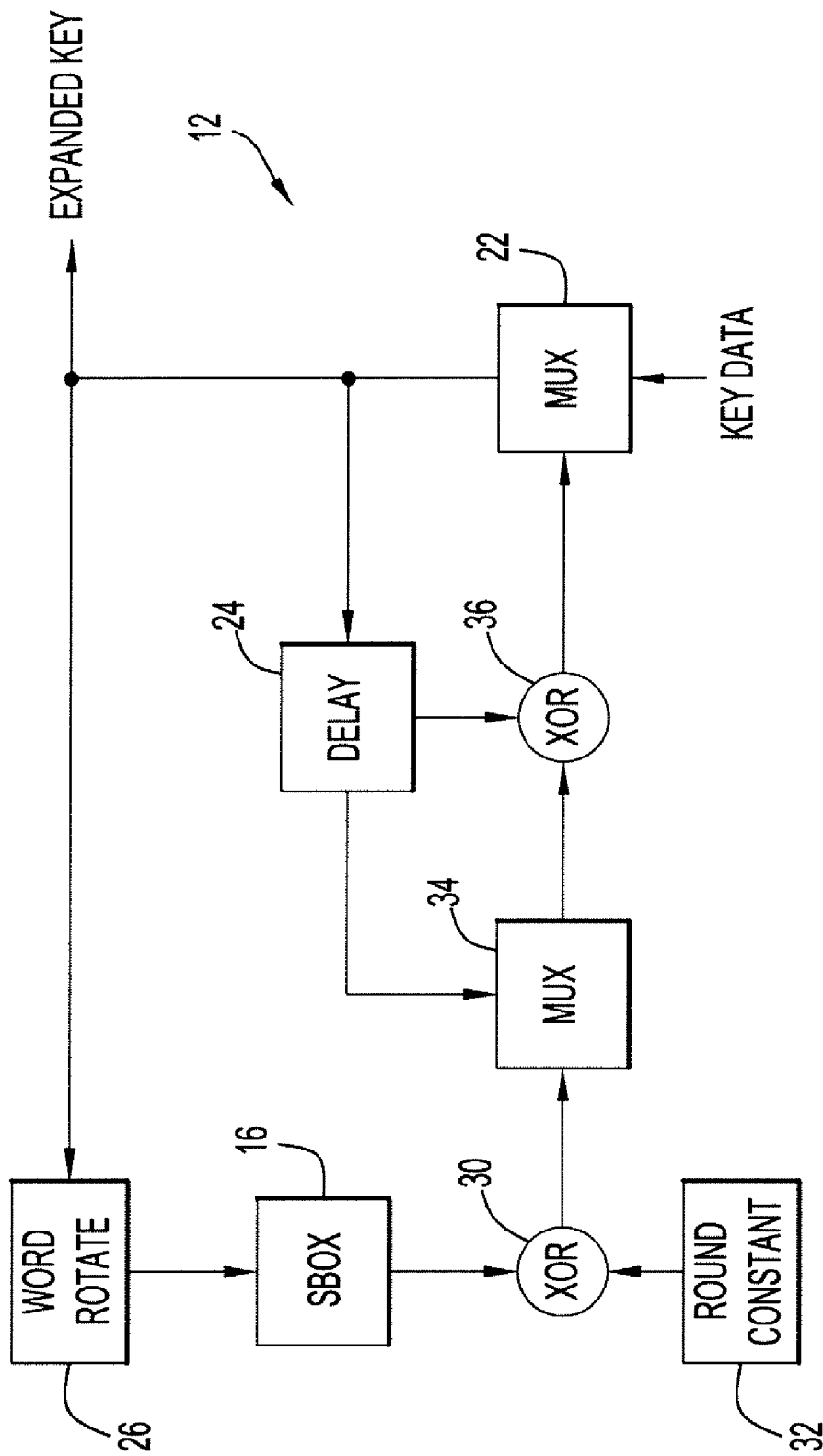
FIG. 2 is a block diagram of an example key expansion module of the encoder of FIG. 1.

Key expansion module 12 of encoder 10 is illustrated, by way example only, in FIG. 2. Specifically, key expansion module 12 includes substitution module 16 (e.g., SBOX as viewed in FIG. 2), a key multiplexer module 22 (e.g., MUX as viewed in FIG. 2), a delay module 24 (e.g., DELAY as viewed in FIG. 2), a rotate module 26 (e.g., WORD ROTATE as viewed in FIG. 2), a key logic module 30 (e.g., XOR as viewed in FIG. 2), a constant module 32 (e.g., ROUND CONSTANT as viewed in FIG. 2), a data multiplexer module 34 (e.g., MUX as viewed in FIG. 2), and an expansion logic module 36 (e.g., XOR as viewed in FIG. 2).

The data of the original or main key (e.g., KEY DATA as viewed in FIG. 2) is provided to data multiplexer module 22 in data words or segments each including thirty-two bits. The data multiplexer module is controlled to select a data word from either the original key data or recent expanded key data. The selected data word serves as the expanded key portion (e.g., EXPANDED KEY as viewed in FIG. 2) provided by key expansion module 12 to logic module 14 (FIG. 1). The selected data word is further provided from key multiplexer module 22 to delay module 24 and rotate module 26. Delay module 24 is coupled to key multiplexer module 22, and serves as key storage (and thus consumes no additional storage elements). Rotate module 26 is coupled to key multiplexer module 22, and rotates or performs an 8-bit circular shift on a thirty-two bit data word. The shifted data word is provided to substitution module 16 that is substantially similar to the substitution module described above, and includes a look-up table for the key expansion. The substitution module is coupled to rotate module 26 and performs a byte substitution transformation, where each byte of the shifted data word is substituted with data from the look-up table.

The substituted data word is provided to key logic module 30 that is coupled to substitution module 16 and constant module 32. The constant module includes a sixteen location by eight bit look-up table. Key logic module 30 applies (e.g., via one or more exclusive OR (XOR) operations) appropriate data from the look-up table (e.g., round constant) to the substituted data word. The resulting key data from key logic module 30 is provided to data multiplexer module 34. The data multiplexer module is coupled to key logic module 30 and controlled to provide either the resulting key data and/or previously stored key data from delay module 24 to expansion logic module 36. The expansion logic module is coupled to data multiplexer module 34, key multiplexer module 22 and delay module 24, and combines (e.g., via one or more exclusive OR (XOR) operations) the key data from data multiplexer module 34 and delay module 24 to produce an expanded key segment. The expanded key segment is provided to key multiplexer module 22, and the loop is repeated as described above to sufficiently expand the key to encrypt the input data.

In order to perform key expansion, key multiplexer module 22 and data multiplexer module 34 are controlled to provide the proper data. In particular, key multiplexer module 22 is controlled to select the original or main key data words in order to provide the entire key as the initial expanded key portions (e.g., EXPANDED KEY as viewed in FIG. 2) provided by key expansion module 12 to logic module 14 (FIG. 1). The selection performed by data multiplexer module 34 during this initial process has no effect on the key expansion since the expanded key data is not being selected by key multiplexer module 22.

Once the entire original key has been provided as the expanded key portions (e.g., EXPANDED KEY as viewed in FIG. 2), key multiplexer module 22 is controlled to select the expanded key data from expansion logic module 36. The selected expanded key data serves as the expanded key portion (e.g., EXPANDED KEY as viewed in FIG. 2) provided by key expansion module 12 to logic module 14 (FIG. 1), and is further stored in delay module 24 and processed as described above. Data multiplexer module 34 is controlled to select the appropriate data to be combined by expansion logic module 36 for the key expansion. In particular, the data multiplexer module selects, for the first data word of each expanded key, the prior expanded key data from key logic module 30 to enable expansion logic 36 to combine this with prior key data (e.g., key data for data offset by the key length) provided by delay module 24 and produce the expanded key portion. For the remaining data words for each expanded key, expansion logic 36 produces the expanded key portion from the most recent expanded key data (from delay module 24) selected by data multiplexer module 34 and prior key data provided by delay module 24. This prior key data includes key data for data offset by the key length. For example, in the case of a 128-bit key (partitioned into four 32-bit words) with plural 128-bit key expansions (each expansion partitioned into four 32-bit words), an expanded key for a word in a current key expansion is produced by utilizing the expanded key data from the corresponding word in the prior key expansion (e.g., the prior expansion being offset by the key length).

The overwhelming majority of logic required to perform the key expansion is contained within substitution module 16, where each byte of data that is transformed requires a 256 location by eight-bit look-up table. The present invention embodiments provide significant advantages based on the substitution modules of the encoder and key expansion module being substantially similar. In other words, encryption and key expansion each perform application of the non-linear byte substitution transformation. The present invention embodiments reuse the substitution module logic utilized during the encryption cycles to perform key expansion and create an AES implementation requiring less area of a chip. For example, an embodiment of the present invention multiplexes data into the substitution module at appropriate times during available clock cycles of the encryption process or loop. This enables the substitution module to be reused for key expansion with minimal additional circuitry (e.g., a set of multiplexers and control signals for those multiplexers), and enhances throughput since key expansion may be performed utilizing available clock cycles of the encryption loop.

Further, the present invention embodiments add pipeline stages to the input and output of the substitution module, thereby enabling the function to be synthesized into a simple synchronous memory block. This further minimizes the logic resources required to implement the encryption, especially in the case where the encryption is targeted for a Field Programmable Gate Array (FPGA).

Figure 3:
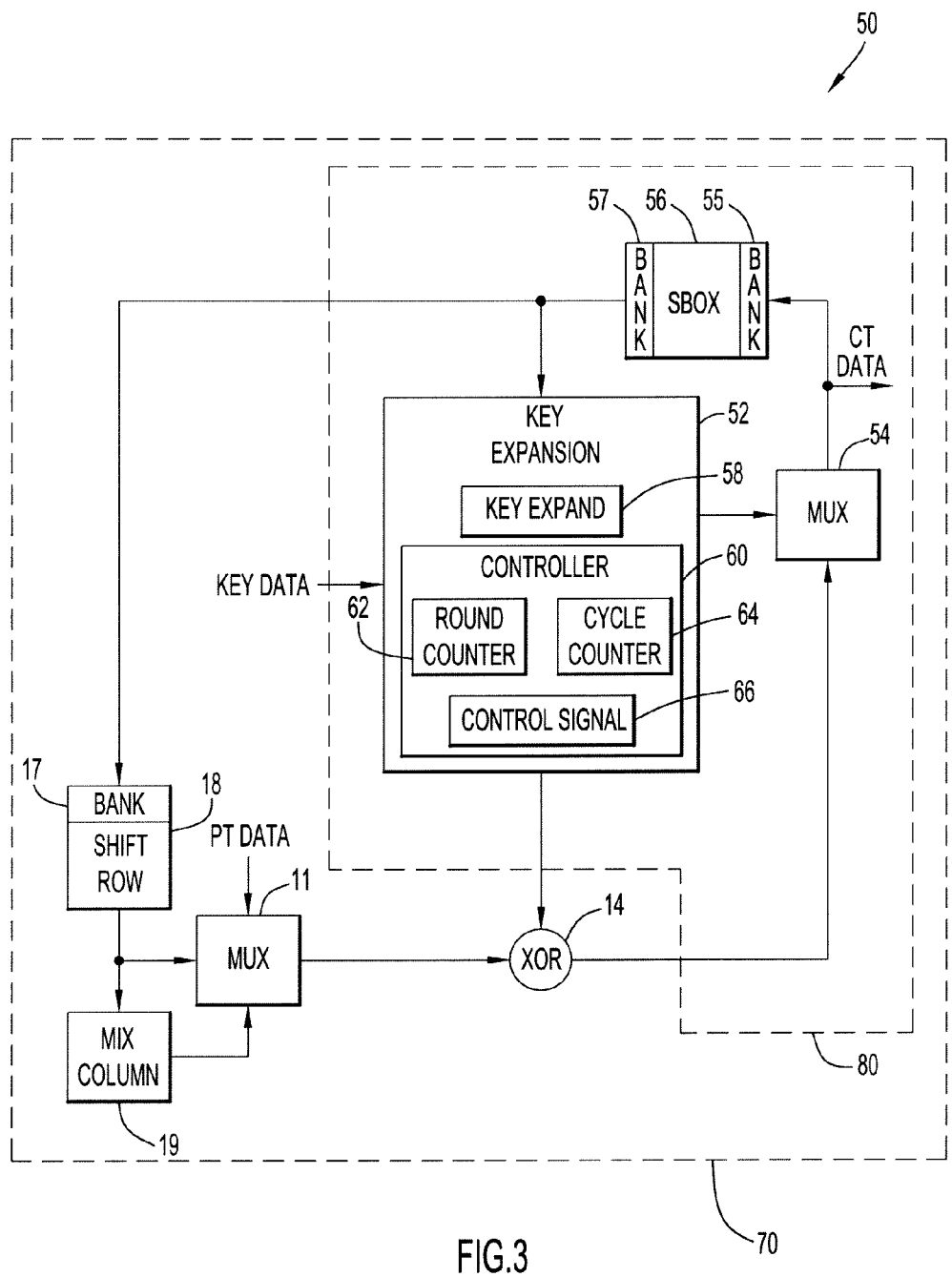
FIG. 3 is a block diagram of an example encoder performing key expansion within an encryption loop according to an embodiment of the present invention.

An example encoder utilizing a common substitution module for encryption and key expansion according to an embodiment of the present invention is illustrated in FIG. 3. Initially, encoder 50 may be implemented by one or more hardware modules or units (e.g., logic circuits, Field Programmable Gate Array (FPGA), circuitry, etc.), or a combination of hardware and software modules or units. Specifically, encoder 50 includes multiplexer module 1 (e.g., MUX as viewed in FIG. 3), logic module 14 (e.g., XOR as viewed in FIG. 3), shift module 18 (e.g., SHIFT ROW as viewed in FIG. 3), and mix module 19 (e.g., MIX COLUMN as viewed in FIG. 3), each performing substantially the same functions as the corresponding components described above. Encoder 50 further includes a key expansion module 52 (e.g., KEY EXPANSION as viewed in FIG. 3), an encode multiplexer module 54 (e.g., MUX as viewed in FIG. 3), and a substitution module 56 (e.g., SBOX as viewed in FIG. 3). By way of example, encoder 50 encrypts data according to the AES scheme, where a series of processing activities are repeated to form rounds of keyed transformations between input data and the resulting encoded data. The encoder operates on 128-bit data blocks each processed in the form of an array of sixteen bytes arranged into four rows by four columns. However, encoder 50 may be configured to encode data in accordance with any suitable encryption or encoding scheme.

Encoder 50 basically includes an encryption loop 70 for encrypting data (e.g., including multiplexer module 1, logic module 14, shift module 18, mix module 19, key expansion module 52, encode multiplexer module 54, and substitution module 56), and a key expansion loop 80 nested within encryption loop 70 for key expansion (e.g., including key expansion module 52, encode multiplexer module 54, and substitution module 56). Encode multiplexer module 54 controls use of substitution module 56 by key expansion loop 80 during encryption. This is basically accomplished by injecting key expansion data within encryption loop 70 during available clock cycles of that encryption loop as described below.

With respect to encryption loop 70, plaintext or input data (e.g., PT DATA as viewed in FIG. 3) is provided to multiplexer module 1 in the form of a 128-bit data block, preferably provided one word (e.g., 32 bits) at a time and processed as an array of bytes including four rows by four columns. The multiplexer module is further coupled to shift module 18 and mix module 19, and selects the appropriate data for transference to logic module 14 in accordance with control signals generated by encoder 50. Multiplexer module 1 is coupled to logic module 14, and provides the various data to the logic module based on the particular round of the encryption scheme. For example, the input data is provided to logic module 14 for the initial round, data from shift module 18 is provided to the logic module for the final round, and data from mix module 19 is provided to the logic module for intermediate rounds. Since the input data is utilized for the initial round of processing, multiplexer module 1 initially selects the input data for transference to logic module 14.

The logic module is further coupled to key expansion module 52 that expands the encryption key to a desired length as described below. The logic module preferably includes a set of exclusive OR (XOR) gates and multiplies (via one or more exclusive OR (XOR) operations) the input data by an expanded key portion from key expansion module 52.

The result from logic module 14 is applied to encode multiplexer module 54. The encode multiplexer module is coupled to logic module 14 and key expansion module 52 and, in the encryption loop, provides the result from logic module 14 to substitution module 56. The substitution module is coupled to encode multiplexer module 54, includes look-up tables for encryption and key expansion, and performs a byte substitution transformation, where each byte of the result is substituted with data from the encryption look-up table. Substitution module 56 includes a bank 55 of 32 flip-flops (each storing one bit) at the input, and a bank 57 of 32 flip-flops (each storing one bit) at the output, where each bank forms a respective pipeline stage. These pipeline stages create a consistent delay through the substitution module across all 32 bits of a word. In addition, the pipeline stages allow for the substitution function to be implemented in a synchronous memory block, further minimizing the amount of logic resources required to implement the encryption.

Shift module 18 is coupled to substitution module 56, receives the transformed data from the substitution module, and cyclically shifts that data by an offset. For example, the array rows are cyclically shifted left by an offset, where the first row of the array remains unchanged, while the offset is applied to shift the bytes within the remaining array rows. Shift module 18 further includes a bank 17 of 32 flip-flops (each storing one bit) at the input serving as a pipeline stage. This pipeline stage enables assembly of the 128-bit data block prior to the shift operation, and serves as storage for the intermediate data value computed for each round of the encryption. Due to the pipeline stages, six clock cycles (e.g., four clock cycles for four 32 bit words (128 total bits)+2 pipeline clock cycles) are required to process a 128-bit data block for each round as described below.

During the initial and intermediate rounds, the shifted data is provided to mix module 19. The mix module is coupled to shift module 18 and multiplies four bytes of each column of the shifted data with a fixed polynomial or function. The resulting data for the round is provided to multiplexer module 1 for transference to logic module 14 to initiate the next round, where the logic module applies a subsequent portion of the expanded key from key expansion module 52. The encryption loop is repeated for each of the remaining intermediate rounds utilizing the data from the prior round. During the final round, mix module 19 is bypassed, and the shifted data from shift module 18 for that round is provided through multiplexer module 1 to logic module 14. The logic module applies the proper portion of the expanded key from key expansion module 52 as described above, where the resulting data is provided as the cyphertext result (e.g., CT DATA as viewed in FIG. 3).

With respect to key expansion loop 80, the data of the original or main key (e.g., KEY DATA as viewed in FIG. 3) is provided to key expansion module 52. The key expansion module is further coupled to substitution module 56, and includes a key expand module 58, and a controller 60. Controller 60 includes a round counter 62, a cycle counter 64, and a control signal module 66. The round and cycle counters respectively maintain counts of the encryption round and the pipeline clock cycles within that round. The cycle counter basically wraps around the cycles for each round. Since these counters are already present in order to control the encryption loop, the additional logic required for key expansion is control signal module 66. The control signal module generates control signals for encode multiplexer module 54 based on the cycle counts to control use of substitution module 56 for key expansion during the encryption loop. For example, control signal module 66 produces control signals to enable encode multiplexer module 54 to provide key expansion data in response to cycle counter 64 being equal to 0 (e.g., indicating the start of a new round) as described below.

Key expand module 58 provides the appropriate expanded key portion to logic module 14 for the encryption loop, and further provides key expansion data to encode multiplexer module 54 during the key expansion loop. The encode multiplexer module receives the control signals from control signal module 66, and provides data for key expansion to substitution module 56 at appropriate times during the encryption loop. The substitution module performs a byte substitution transformation, where each byte of the key expansion data is substituted with data from the expansion look-up table. The result from the substitution module is provided to key expand module 58 for further processing to produce expanded key data as described below.

Since usage of the expanded key data from substitution module 56 changes based on the key length, key expand module 58 dynamically accommodates keys of varying length as described below. For example, key expand module 58 may dynamically accommodate key lengths of 128, 192, and 256 bits for the AES encryption. The key length for an application may be dynamically provided to the key expand module in various manners (e.g., user input, setting a parameter, etc.). This enables encoder 50 to provide flexibility and adapt to various keys and encryption schemes.

Figure 4:
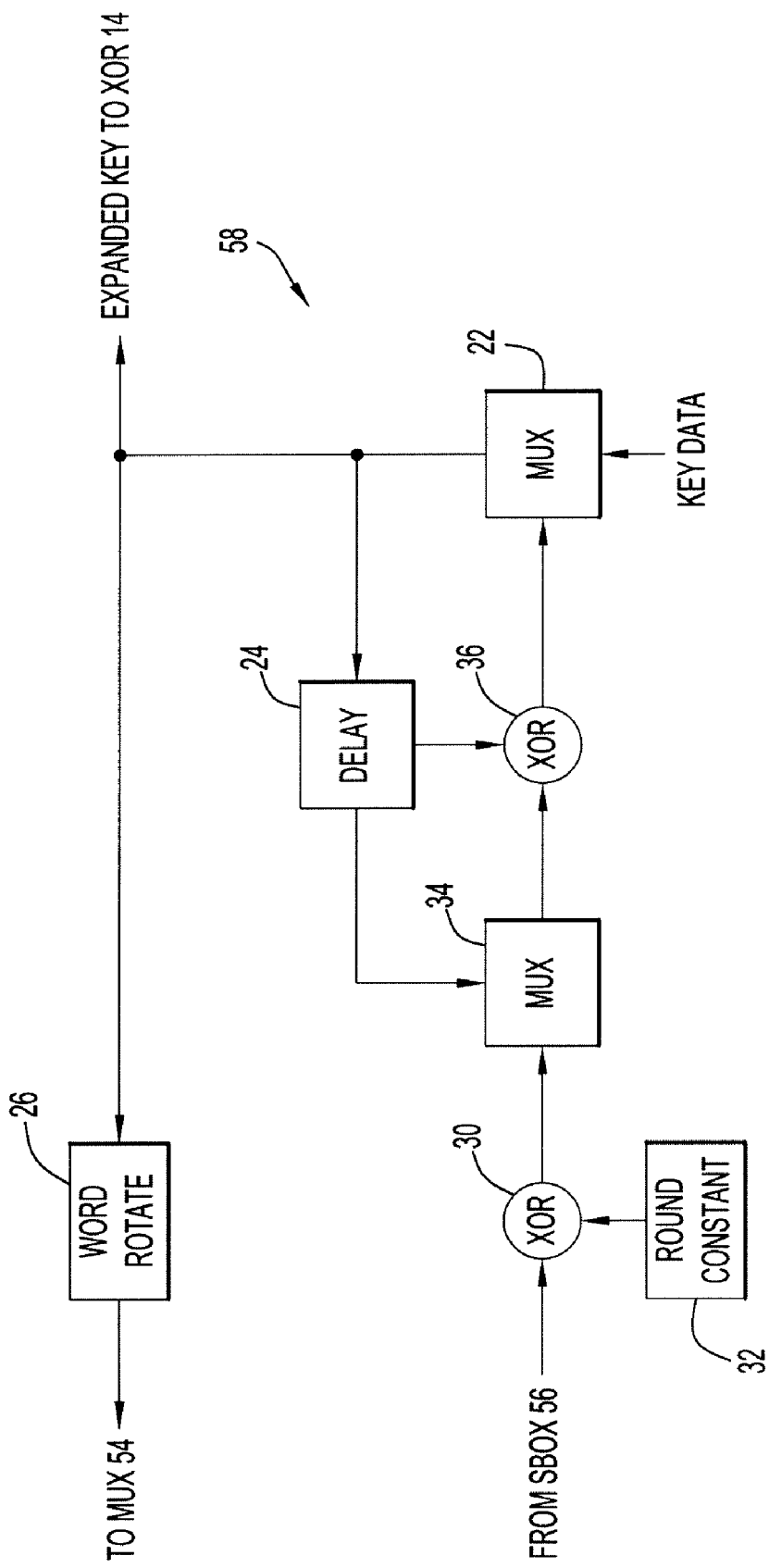
FIG. 4 is a block diagram of the key expansion module for the encoder of FIG. 3.

Key expand module 58 of encoder 50 is illustrated, by way example only, in FIG. 4. Specifically, key expand module 58 includes key multiplexer module 22 (e.g., MUX as viewed in FIG. 4), delay module 24 (e.g., DELAY as viewed in FIG. 4), rotate module 26 (e.g., WORD ROTATE as viewed in FIG. 4), key logic module 30 (e.g., XOR as viewed in FIG. 4), constant module 32 (e.g., ROUND CONSTANT as viewed in FIG. 4), data multiplexer module 34 (e.g., MUX as viewed in FIG. 4), and expansion logic module 36 (e.g., XOR as viewed in FIG. 4), each performing substantially the same functions as the corresponding components described above.

The data of the original or main key (e.g., KEY DATA as viewed in FIG. 4) is provided to data multiplexer module 22 in data words or segments each including thirty-two bits. The data multiplexer module is controlled to select a data word from either the original key data or recent expanded key data. The selected data word serves as the expanded key portion (e.g., EXPANDED KEY as viewed in FIG. 4) provided by key expansion module 52 to logic module 14 (FIG. 3). The selected data word is further provided from key multiplexer module 22 to delay module 24 and rotate module 26. Delay module 24 is coupled to key multiplexer module 22, and serves as key storage (and thus consumes no additional storage elements). Rotate module 26 is coupled to key multiplexer module 22, and rotates or performs an 8-bit circular shift on a thirty-two bit data word. The rotate module is preferably implemented by a set of wires to shift the bit sequence (e.g., without consuming logic resources). The shifted data word is provided to multiplexer module 54 (FIG. 3) for transference to substitution module 56 (at appropriate times during the encryption loop) that includes the look-up table for the key expansion. The substitution module is coupled to rotate module 26 and performs a byte substitution transformation, where each byte of the shifted data word is substituted with data from the expansion look-up table.

The substituted data word from substitution module 56 is provided to key logic module 30 that is coupled to constant module 32. The constant module includes a sixteen location by eight bit look-up table. Key logic module 30 preferably includes a set of exclusive OR (XOR) gates, and applies (via one or more exclusive OR (XOR) operations) appropriate data from the look-up table (e.g., round constant) to the substituted data word. The resulting key data from key logic module 30 is provided to data multiplexer module 34. The data multiplexer module is coupled to key logic module 30 and controlled to provide either the resulting key data and/or previously stored key data from delay module 24 to expansion logic module 36. The expansion logic module is coupled to data multiplexer module 34, key multiplexer module 22 and delay module 24, preferably includes a set of exclusive OR (XOR) gates, and combines (via one or more exclusive OR (XOR) operations) the key data from data multiplexer module 34 and delay module 24 to produce an expanded key segment. The expanded key segment is provided to data multiplexer module 22, and the loop is repeated as described above to sufficiently expand the key to encrypt the input data.

Rotate module 26 and constant module 32 may not be needed during some iterations of the key expansion (e.g., in the case of a 256-bit key as described below). In this case, controller 60 and/or control signal module 66 may control the key expansion processing to disable the processing by the rotate module and constant module for those iterations. Alternatively, rotate module 26 and key logic module 30 may be controlled to simply pass the data without processing, or constant module 32 may be controlled to provide a null value to key logic module 30 that enables the output to be the input data received from substitution module 56. In addition, the rotate and constant modules may be bypassed during those iterations (e.g., where substitution module 56 receives unshifted data and provides the substituted result to data multiplexer module 34).

In order to perform key expansion, key multiplexer module 22 and data multiplexer module 34 are controlled to provide the proper data. In particular, key multiplexer module 22 is controlled to select the original or main key data words in order to provide the entire key as the initial expanded key portions (e.g., EXPANDED KEY as viewed in FIG. 4) provided by key expansion module 52 to logic module 14 (FIG. 3). The selection performed by data multiplexer module 34 during this initial process has no effect on the key expansion since the expanded key data is not being selected by key multiplexer module 22. Once the entire original key has been provided as the expanded key portions (e.g., EXPANDED KEY as viewed in FIG. 4), key multiplexer module 22 is controlled to select the expanded key data from expansion logic module 36. The selected expanded key data serves as the expanded key portion (e.g., EXPANDED KEY as viewed in FIG. 4) provided by key expansion module 52 to logic module 14 (FIG. 3), and is further stored in delay module 24 and processed as described above. Data multiplexer module 34 is controlled to select the appropriate data to be combined by expansion logic module 36 for the key expansion as described below.

Since usage of the expanded key data from substitution module 56 (and hence key logic module 30) changes based on the key length, key expand module 58 dynamically accommodates keys of varying length (e.g., key lengths of 128, 192, and 256 bits for the AES encryption). The key length for an application may be dynamically provided to the key expand module in various manners (e.g., user input, setting a parameter, etc.). Control signal module 66 produces control signals to enable encode multiplexer module 54 (FIG. 3) to provide key expansion data in the encryption loop at appropriate times (e.g., in response to cycle counter 64 being equal to 0 (e.g., indicating the start of a new round)) for key expansion as described below. The assertion of this multiplexer control signal occurs identically for each of the 128, 192 and 256-bit key lengths. Thus, for the two clock pipeline delay through substitution module 56 (e.g., pipeline stages at the input and output of the substitution module as described above), the output data from the substitution module is an expanded key substitution value when cycle counter 64 is equal to two. However, the usage of this key data by key expand module 58 changes depending upon the length of the key selected (e.g., a 128-bit, a 192-bit, or a 256-bit key).

In the case of a 128-bit key, the output from substitution module 56 (and key logic module 30) is used once for each four cycles (e.g., 128-bit key/32 bits per word) of data (e.g., one per encryption round). Since the 128-bit key can be represented as four 32-bit concatenated words $\{W_0\ W_1\ W_2\ W_3\}$, the key material, $\omega_n$, produced by expansion logic module 36 and serving as expanded key portions may be computed as shown, by way of example only, in Table I below, where: RCON represents output from constant module 32; SBOX( ) represents in function form output from substitution module 56 based on the specified input; ROT( ) represents in function form output from rotate module 26 based on the specified input; and $\oplus$ represents the exclusive OR (XOR) function. In this case, key material $\omega_0$-$\omega_3$ represent the original key data, while $\omega_4$-$\omega_{11}$ represent expanded key portions.

TABLE I

| | Expansion |
|---|---|
| Round 0: | $\omega_0 = W_0$ |
| | $\omega_1 = W_1$ |
| | $\omega_2 = W_2$ |
| | $\omega_3 = W_3$ |
| Round 1: | $\omega_4 = \omega_0 \oplus RCON \oplus SBOX\ (ROT\ (\omega_3))$ |
| | $\omega_5 = \omega_1 \oplus \omega_4$ |
| | $\omega_6 = \omega_2 \oplus \omega_5$ |
| | $\omega_7 = \omega_3 \oplus \omega_6$ |
| Round 2: | $\omega_8 = \omega_4 \oplus RCON \oplus SBOX\ (ROT\ (\omega_7))$ |
| | $\omega_9 = \omega_5 \oplus \omega_8$ |
| | $\omega_{10} = \omega_6 \oplus \omega_9$ |
| | $\omega_{11} = \omega_7 \oplus \omega_{10}$ |
| | ... |

In order to perform this key expansion (e.g., indicated in Table I), key multiplexer module 22, data multiplexer module 34 and encode multiplexer module 54 are dynamically controlled by controller 60 and/or control signal module 66 to provide the proper data and perform appropriate scheduling of key expansion in the encryption loop in response to an indication that the key is a 128-bit key and based on the round and cycle counts. In particular, key multiplexer module 22 is controlled to select the original or main key data words, $\omega_0$-$\omega_3$, in order to provide the entire key as the initial expanded key portion (e.g., EXPANDED KEY as viewed in FIG. 4) for round 0. The selection performed by data multiplexer module 34 during this initial process has no effect on the key expansion since the expanded key data is not being selected by key multiplexer module 22.

Once the entire original key has been provided as the expanded key portions (e.g., EXPANDED KEY as viewed in FIG. 4), key multiplexer module 22 is controlled to select the expanded key data from expansion logic module 36 for subsequent rounds. The selected expanded key data serves as the expanded key portion (e.g., EXPANDED KEY as viewed in FIG. 4) provided by key expansion module 52 to logic module 14 (FIG. 3), and is further stored in delay module 24. Data multiplexer module 34 is controlled to select, for the first data word of each remaining round, the prior expanded key data word from key logic module 30 to enable expansion logic module 36 to combine this with prior key data (e.g., key data for data offset by the key length (e.g., 128 bits or 4 data words)) provided by delay module 24 and produce the expanded key portion as shown in Table I (e.g., $\omega_4 = \omega_0 \oplus RCON \oplus SBOX\ (ROT\ (\omega_3))$). The data multiplexer module selects, for the remaining data words for each expanded key, the most recent expanded key data (from delay module 24) to enable expansion logic module 36 to combine this with prior key data provided by delay module 24 and produce the expanded key portion. This prior key data includes key data for data offset by the key length (e.g., 128 bits or 4 data words) as shown in Table I (e.g., $\omega_5 = \omega_1 \oplus \omega_4$).

Due to the pipeline delays, the key material, $\omega_n$, is routed through the substitution module one round prior to use within the encryption loop. For example, key material $\omega_3$ is processed during round zero, even though the new value is used in round one. Key data for a 128-bit key may scheduled through substitution module 56 according to the schedule shown, by way of example only, in Table II below, where: SBOX( ) represents in function form output from substitution module 56 based on the specified input; and ROT( ) represents in function form output from rotate module 26 based on the specified input. The scheduling is dynamically controlled by controller 60 and/or control signal module 66 providing controls for encode multiplexer module 54.

TABLE II

| ENCRYPT ROUND COUNT | SBOX Input (CYCLE = 0) | SBOX Output (CYCLE = 2) |
|---|---|---|
| 0 | ROT ($\omega_3$) | SBOX (ROT ($\omega_3$)) |
| 1 | ROT ($\omega_7$) | SBOX (ROT ($\omega_7$)) |
| 2 | ROT ($\omega_{11}$) | SBOX (ROT ($\omega_{11}$)) |
| 3 | ROT ($\omega_{15}$) | SBOX (ROT ($\omega_{15}$)) |
| 4 | ROT ($\omega_{19}$) | SBOX (ROT ($\omega_{19}$)) |
| 5 | ROT ($\omega_{23}$) | SBOX (ROT ($\omega_{23}$)) |
| 6 | ROT ($\omega_{27}$) | SBOX (ROT ($\omega_{27}$)) |
| 7 | ROT ($\omega_{31}$) | SBOX (ROT ($\omega_{31}$)) |
| 8 | ROT ($\omega_{35}$) | SBOX (ROT ($\omega_{35}$)) |
| 9 | ROT ($\omega_{39}$) | SBOX (ROT ($\omega_{39}$)) |

In the case of a 192-bit key, the output from substitution module 56 (and key logic module 30) is used once for every six data cycles (e.g., 192-bit key/32 bits per word) of data (e.g., one per 1.5 encryption rounds). Since the 192-bit key can be represented as six 32-bit concatenated words $\{W_0\ W_1\ W_2\ W_3\ W_4\ W_5\}$, the key material, $\omega_n$, produced by expansion logic module 36 and serving as expanded key portions may be computed as shown, by way of example only, in Table III below, where: RCON represents output from constant module 32; SBOX( ) represents in function form output from substitution module 56 based on the specified input; ROT( ) represents in function form output from rotate module 26 based on the specified input; and $\oplus$ represents the exclusive OR (XOR) function. In this example, key material $\omega_0$-$\omega_5$ represent the original key data, while key material $\omega_6$-$\omega_{19}$ represent expanded key portions.

TABLE III

| | Expansion |
|---|---|
| Round 0: | $\omega_0 = W_0$ |
| | $\omega_1 = W_1$ |
| | $\omega_2 = W_2$ |
| | $\omega_3 = W_3$ |
| Round 1: | $\omega_4 = W_4$ |
| | $\omega_5 = W_5$ |
| | $\omega_6 = \omega_0 \oplus \text{RCON} \oplus \text{SBOX (ROT }(\omega_5))$ |
| | $\omega_7 = \omega_1 \oplus \omega_6$ |
| Round 2: | $\omega_8 = \omega_2 \oplus \omega_7$ |
| | $\omega_9 = \omega_3 \oplus \omega_8$ |
| | $\omega_{10} = \omega_4 \oplus \omega_9$ |
| | $\omega_{11} = \omega_5 \oplus \omega_{10}$ |
| Round 3: | $\omega_{12} = \omega_6 \oplus \text{RCON} \oplus \text{SBOX (ROT }(\omega_{11}))$ |
| | $\omega_{13} = \omega_7 \oplus \omega_{12}$ |
| | $\omega_{14} = \omega_8 \oplus \omega_{13}$ |
| | $\omega_{15} = \omega_9 \oplus \omega_{14}$ |
| Round 4: | $\omega_{16} = \omega_{10} \oplus \omega_{15}$ |
| | $\omega_{17} = \omega_{11} \oplus \omega_{16}$ |
| | $\omega_{18} = \omega_{12} \oplus \text{RCON} \oplus \text{SBOX (ROT }(\omega_{17}))$ |
| | $\omega_{19} = \omega_{13} \oplus \omega_{18}$ |
| | . . . |

In order to perform this key expansion (e.g., indicated in Table III), key multiplexer module 22, data multiplexer module 34 and encode multiplexer module 54 are dynamically controlled by controller 60 and/or control signal module 66 to provide the proper data and perform appropriate scheduling of key expansion in the encryption loop in response to an indication that the key is a 192-bit key and based on the round and cycle counts. In particular, key multiplexer module 22 is controlled to select the original or main key data words, $\omega_0$-$\omega_5$, in order to provide the entire key as the initial expanded key portion (e.g., EXPANDED KEY as viewed in FIG. 4). The selection performed by data multiplexer module 34 during this initial process has no effect on the key expansion since the expanded key data is not being selected by key multiplexer module 22.

Once the entire original key has been provided as the expanded key portions (e.g., EXPANDED KEY as viewed in FIG. 4), key multiplexer module 22 is controlled to select the expanded key data from expansion logic module 36. The selected expanded key data serves as the expanded key portion (e.g., EXPANDED KEY as viewed in FIG. 4) provided by key expansion module 52 to logic module 14 (FIG. 3), and is further stored in delay module 24. Data multiplexer module 34 is controlled to select, for the first data word of each expansion of the key (e.g., each successive set of 192 bits), the prior expanded key data from key logic module 30 to enable expansion logic module 36 to combine this with prior key data (e.g., key data for prior data offset by the key length (e.g., 192 bits or 6 data words)) provided by delay module 24 and produce the expanded key portion as shown in Table III (e.g., $\omega_6 = \omega_0 \oplus \text{RCON} \oplus \text{SBOX (ROT }(\omega_5))$). The data multiplexer module selects, for the remaining data words for each expanded key, the most recent expanded key data (from delay module 24) to enable expansion logic module 36 to combine this with prior key data provided by delay module 24 and produce the expanded key portion. This prior key data includes key data for data offset by the key length (e.g., 192 bits or 6 data words) as shown in Table III (e.g., $\omega_7 = \omega_1 \oplus \omega_6$).

Due to the pipeline delays, the key material, $\omega_n$, is routed through the substitution module one round prior to use within the encryption loop; however, not all rounds require this expansion of the key material. Therefore, even though key material is routed to the substitution module during each round, the output of the substitution module is ignored by key expand module 58 during those rounds where the expanded data is not needed (e.g., as indicated by DON'T CARE and UNUSED in Table IV below). Key data for a 192-bit key may scheduled through substitution module 56 according to the schedule shown, by way of example only, in Table IV below, where: SBOX( ) represents in function form output from substitution module 56 based on the specified input; and ROT( ) represents in function form output from rotate module 26 based on the specified input. The scheduling is dynamically controlled by controller 60 and/or control signal module 66 providing controls for encode multiplexer module 54.

TABLE IV

| ENCRYPT ROUND COUNT | SBOX Input (CYCLE = 0) | SBOX Output (CYCLE = 2) |
|---|---|---|
| 0 | ROT ($\omega_5$) | SBOX (ROT ($\omega_5$)) |
| 1 | Don't Care | Unused |
| 2 | ROT ($\omega_{11}$) | SBOX (ROT ($\omega_{11}$)) |
| 3 | ROT ($\omega_{17}$) | SBOX (ROT ($\omega_{17}$)) |
| 4 | Don't Care | Unused |
| 5 | ROT ($\omega_{23}$) | SBOX (ROT ($\omega_{23}$)) |
| 6 | ROT ($\omega_{29}$) | SBOX (ROT ($\omega_{29}$)) |
| 7 | Don't Care | Unused |
| 8 | ROT ($\omega_{35}$) | SBOX (ROT ($\omega_{35}$)) |
| 9 | ROT ($\omega_{41}$) | SBOX (ROT ($\omega_{41}$)) |
| 10 | Don't Care | Unused |
| 11 | ROT ($\omega_{47}$) | SBOX (ROT ($\omega_{47}$)) |

In the case of a 256-bit key, the output from substitution module 56 is used during each round of the encryption, but key expand module 58 only applies rotate module 26 and constant module 32 during alternating round counts, beginning with round 2. This is accomplished by controller 60 and/or control signal module 66 providing controls to rotate module 26, constant module 32 and/or key logic module 30 as described above. Since the 256-bit key can be represented as eight 32-bit concatenated words $\{W_0\ W_1\ W_2\ W_3\ W_4\ W_5\ W_6\ W_7\}$, the key material, $\omega_n$, produced by expansion logic module 36 and serving as expanded key portions may be computed as shown, by way of example only, in Table V below, where: RCON represents output from constant module 32; SBOX( ) represents in function form output from substitution module 56 based on the specified input; ROT( ) represents in function form output from rotate module 26 based on the specified input; and $\oplus$ represents the exclusive OR (XOR) function. In this example, key material $\omega_0$-$\omega_7$ represent the original key data, while key material $\omega_8$-$\omega_{23}$ represent expanded key portions.

TABLE V

| | Expansion |
|---|---|
| Round 0: | $\omega_0 = W_0$ |
| | $\omega_1 = W_1$ |
| | $\omega_2 = W_2$ |
| | $\omega_3 = W_3$ |

TABLE V-continued

Expansion

| | |
|---|---|
| Round 1: | $\omega_4 = W_4$ |
| | $\omega_5 = W_5$ |
| | $\omega_6 = W_6$ |
| | $\omega_7 = W_7$ |
| Round 2: | $\omega_8 = \omega_0 \oplus RCON \oplus SBOX\ (ROT\ (\omega_7))$ |
| | $\omega_9 = \omega_1 \oplus \omega_8$ |
| | $\omega_{10} = \omega_2 \oplus \omega_9$ |
| | $\omega_{11} = \omega_3 \oplus \omega_{10}$ |
| Round 3: | $\omega_{12} = \omega_4 \oplus SBOX\ (\omega_{11})$ |
| | $\omega_{13} = \omega_5 \oplus \omega_{12}$ |
| | $\omega_{14} = \omega_6 \oplus \omega_{13}$ |
| | $\omega_{15} = \omega_7 \oplus \omega_{14}$ |
| Round 4: | $\omega_{16} = \omega_8 \oplus RCON \oplus SBOX\ (ROT\ (\omega_{15}))$ |
| | $\omega_{17} = \omega_9 \oplus \omega_{16}$ |
| | $\omega_{18} = \omega_{10} \oplus \omega_{17}$ |
| | $\omega_{19} = \omega_{11} \oplus \omega_{18}$ |
| Round 5: | $\omega_{20} = \omega_{12} \oplus SBOX\ (\omega_{19})$ |
| | $\omega_{21} = \omega_{13} \oplus \omega_{20}$ |
| | $\omega_{22} = \omega_{14} \oplus \omega_{21}$ |
| | $\omega_{23} = \omega_{15} \oplus \omega_{22}$ |
| | ... |

In order to perform this key expansion (e.g., indicated in Table V), key multiplexer module 22, data multiplexer module 34 and encode multiplexer module 54 are dynamically controlled by controller 60 and/or control signal module 66 to provide the proper data and perform appropriate scheduling of key expansion in the encryption loop in response to an indication that the key is a 256-bit key and based on the round and cycle counts. In particular, key multiplexer module 22 is controlled to select the original or main key data words, $\omega_0$-$\omega_7$, in order to provide the entire key as the initial expanded key portion (e.g., EXPANDED KEY as viewed in FIG. 4). The selection performed by data multiplexer module 34 during this initial process has no effect on the key expansion since the expanded key data is not being selected by key multiplexer module 22.

Once the entire original key has been provided as the expanded key portions (e.g., EXPANDED KEY as viewed in FIG. 4), key multiplexer module 22 is controlled to select the expanded key data from expansion logic module 36. The selected expanded key data serves as the expanded key portion (e.g., EXPANDED KEY as viewed in FIG. 4) provided by key expansion module 52 to logic module 14 (FIG. 3), and is further stored in delay module 24. Data multiplexer module 34 is controlled to select, for the first data word of each round, the prior expanded key data from key logic module 30 (or substitution module 56 for iterations without shifting and application of the round constant) to enable expansion logic module 36 to combine this with prior key data (e.g., key data for prior data offset by the key length (e.g., 256 bits or 8 data words)) provided by delay module 24 and produce the expanded key portion as shown in Table V (e.g., $(\omega_8 = \omega_0 \oplus RCON \oplus SBOX\ (ROT\ (\omega_7)))$. The data multiplexer module selects, for the remaining data words for each expanded key, the most recent expanded key data (from delay module 24) to enable expansion logic module 36 to combine this with prior key data provided by delay module 24 and produce the expanded key portion. This prior key data includes key data for data offset by the key length (e.g., 256 bits or 8 data words) as shown in Table V (e.g., $\omega_9 = \omega_1 \oplus \omega_8$).

Due to the pipeline delays, the key material, $\omega n$, is routed through the substitution module one round prior to use within the encryption loop; however, since the first expanded key data is not needed until the third round of encryption, the key data during the first round is ignored by key expand module 58 (e.g., as indicated by DON'T CARE and UNUSED in Table VI below). Key data for a 256-bit key may scheduled through substitution module 56 according to the schedule shown, by way of example only, in Table VI below, where: SBOX( ) represents in function form output from substitution module 56 based on the specified input; and ROT( ) represents in function form output from rotate module 26 based on the specified input. The scheduling is dynamically controlled by controller 60 and/or control signal module 66 providing controls for encode multiplexer module 54.

TABLE VI

| ENCRYPT ROUND COUNT | SBOX Input (CYCLE = 0) | SBOX Output (CYCLE = 2) |
|---|---|---|
| 0 | Don't Care | Unused |
| 1 | ROT ($\omega_7$) | SBOX (ROT ($\omega_7$)) |
| 2 | $\omega_{11}$ | SBOX ($\omega_{11}$) |
| 3 | ROT ($\omega_{15}$) | SBOX (ROT ($\omega_{15}$)) |
| 4 | $\omega_{19}$ | SBOX ($\omega_{19}$) |
| 5 | ROT ($\omega_{23}$) | SBOX (ROT ($\omega_{23}$)) |
| 6 | $\omega_{27}$ | SBOX ($\omega_{27}$) |
| 7 | ROT ($\omega_{31}$) | SBOX (ROT ($\omega_{31}$)) |
| 8 | $\omega_{35}$ | SBOX ($\omega_{35}$) |
| 9 | ROT ($\omega_{39}$) | SBOX (ROT ($\omega_{39}$)) |
| 10 | $\omega_{43}$ | SBOX ($\omega_{43}$) |
| 11 | ROT ($\omega_{47}$) | SBOX (ROT ($\omega_{47}$)) |
| 12 | $\omega_{51}$ | SBOX ($\omega_{51}$) |
| 13 | ROT ($\omega_{55}$) | SBOX (ROT ($\omega_{55}$)) |

The various controls for the encryption and key expansion loops of encoder 50 to accomplish the encryption and key expansion (e.g., scheduling and application of the key material (e.g., Tables I-VI)) described above are preferably performed and/or generated by controller 60 and/or control signal module 66.

Figure 5:
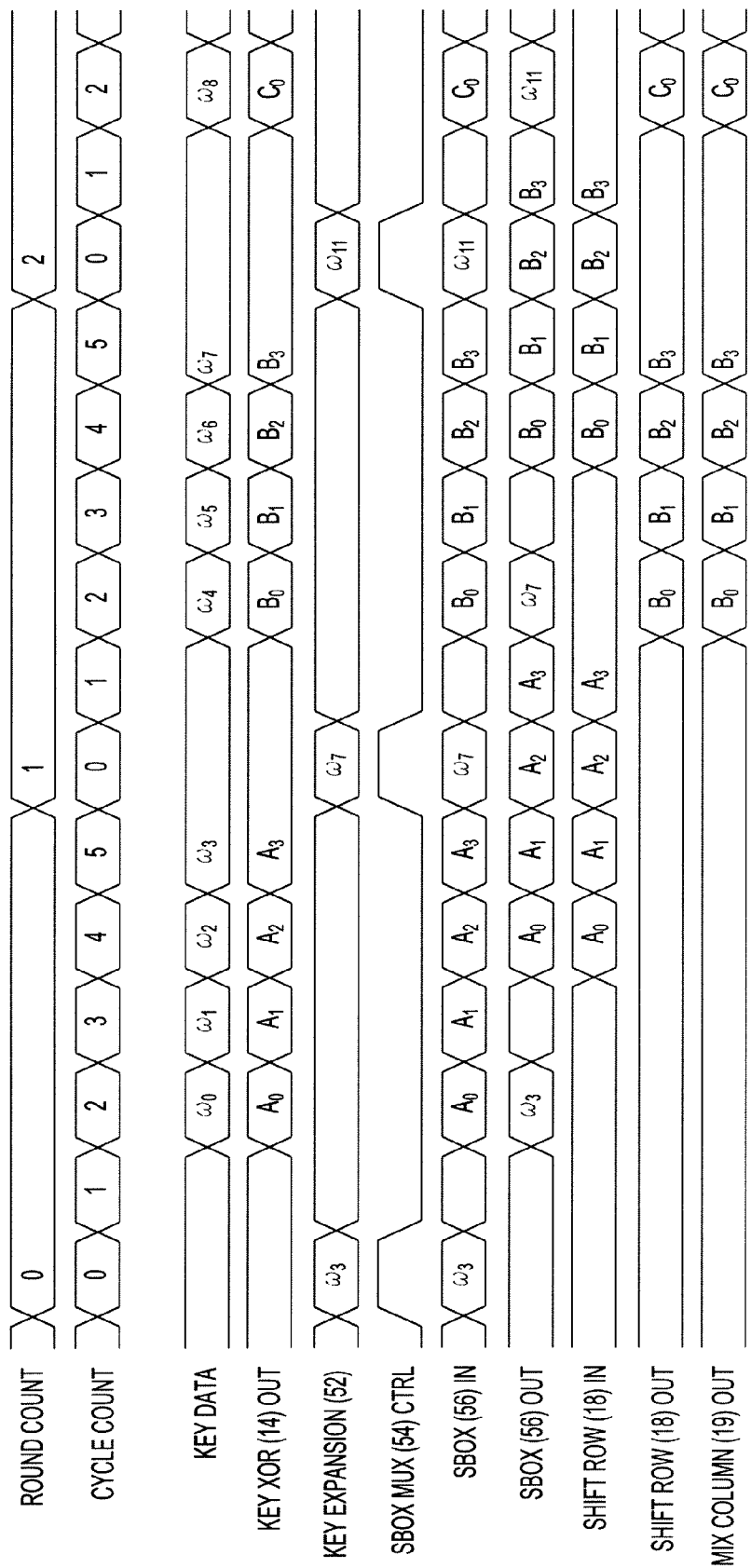
FIG. 5 is a timing diagram illustrating the operation of the encoder of FIG. 3.

Operation of encoder 50 is described with reference to FIGS. 3 and 5. Initially, the timing diagram (FIG. 5) reflects, by way of example, an 128-bit data path that has been partitioned into four 32-bit data words or sections. Encoder 50 includes banks of 32 flip-flops each storing one bit and forming a respective pipeline stage as described above. Pipeline stages are disposed at the input and output of substitution module 56. These pipeline stages create a consistent delay through the substitution module across all 32 bits of a word. In addition, the pipeline stages allow for the substitution function to be implemented in a synchronous memory block, further minimizing the amount of logic resources required to implement the encryption. A pipeline stage is further provided for shift module 18 and enables assembly of the 128-bit data block prior to the shift operation. This pipeline stage further serves as storage for the intermediate data value computed for each round of the encryption. Therefore, there are six clock cycles (e.g., four clock cycles for four 32-bit data words+2 pipeline clock cycles) required to process the 128-bit data block for each round.

In particular, a 128-bit data block of plaintext data (e.g., PT DATA as viewed in FIG. 3) is provided to multiplexer module 1 (one word (or 32 bits) at a time) during four clock cycles. The multiplexer module provides the data to logic module 14 that multiplies (via one or more exclusive OR (XOR) operations) the data by an expanded key portion (e.g., $\omega_n$ of KEY DATA as viewed in FIG. 5) from key expansion module 52. The result from logic module 14 appears at the logic module output (e.g., $A_0$, $A_1$, $A_2$, and $A_3$ of KEY XOR (14) OUT as viewed in FIG. 5), and is applied to encode multiplexer module 54. The encode multiplexer module provides the result from logic module 14 to substitution module 56 (e.g., SBOX (56) IN as viewed in FIG. 5) in accordance with control signals from control signal module 66 (e.g., SBOX MUX (54) CTL as viewed in FIG. 5). The substitution module includes look-up tables for encryption, and performs a byte substitution transformation, where the results appear at the substitution module output two clock cycles later (e.g., SBOX (56) OUT as viewed in FIG. 5), due to the pipeline stages at the input and output.

The output from the substitution module is provided to shift module 18. The shift module receives the transformed data from the substitution module (e.g., $A_0$, $A_1$, $A_2$, and $A_3$ of SHIFT ROW (18) IN as viewed in FIG. 5), and cyclically shifts that data by an offset. The shift module utilizes 128 bits of the data block in the encryption round (e.g., $A_0$, $A_1$, $A_2$, and $A_3$ of SHIFT ROW (18) IN as viewed in FIG. 5) prior to generating the output (e.g., $B_0$, $B_1$, $B_2$, and $B_3$ of SHIFT ROW (18) OUT as viewed in FIG. 5). The shifted data is provided to mix module 19 that multiplies four bytes of each column of the shifted data with a fixed polynomial or function (e.g., $B_0$, $B_1$, $B_2$, and $B_3$ of MIX ROW (19) OUT as viewed in FIG. 5). When all 128 bits are present, the next encryption round begins using the new data (e.g., $B_0$, $B_1$, $B_2$, and $B_3$ of Key XOR (14) OUT, SBOX (56) IN, SBOX (56) OUT, SHIFT ROW (18) IN, SHIFT ROW (18) OUT, and MIX COLUMN (19) OUT).

Due to the clock delays present in the pipeline stages, "dead" cycles are available to route key expansion data to substitution module 56 without impacting the timing of the encryption. This is shown in FIG. 5 where, by way of example only, $\omega_3$, $\omega_7$ and $\omega_{11}$ key expansion values (e.g., KEY EXPANSION (52) as viewed in FIG. 5) are being clocked through the substitution module (e.g., SBOX (56) IN, SBOX (56) OUT as viewed in FIG. 5) for key expansion loop 80 as described above. The injection of key expansion data into encryption loop 70 is controlled by encode multiplexer module 54. Control signal module 66 generates the appropriate control signals for the encode multiplexer module based on the round and cycle counters. By way of example, the control signal for encode multiplexer module 54 to select key expansion data is enabled when the cycle count is equal to zero (e.g., SBOX MUX (54) CTRL as viewed in FIG. 5).

Figure 6:
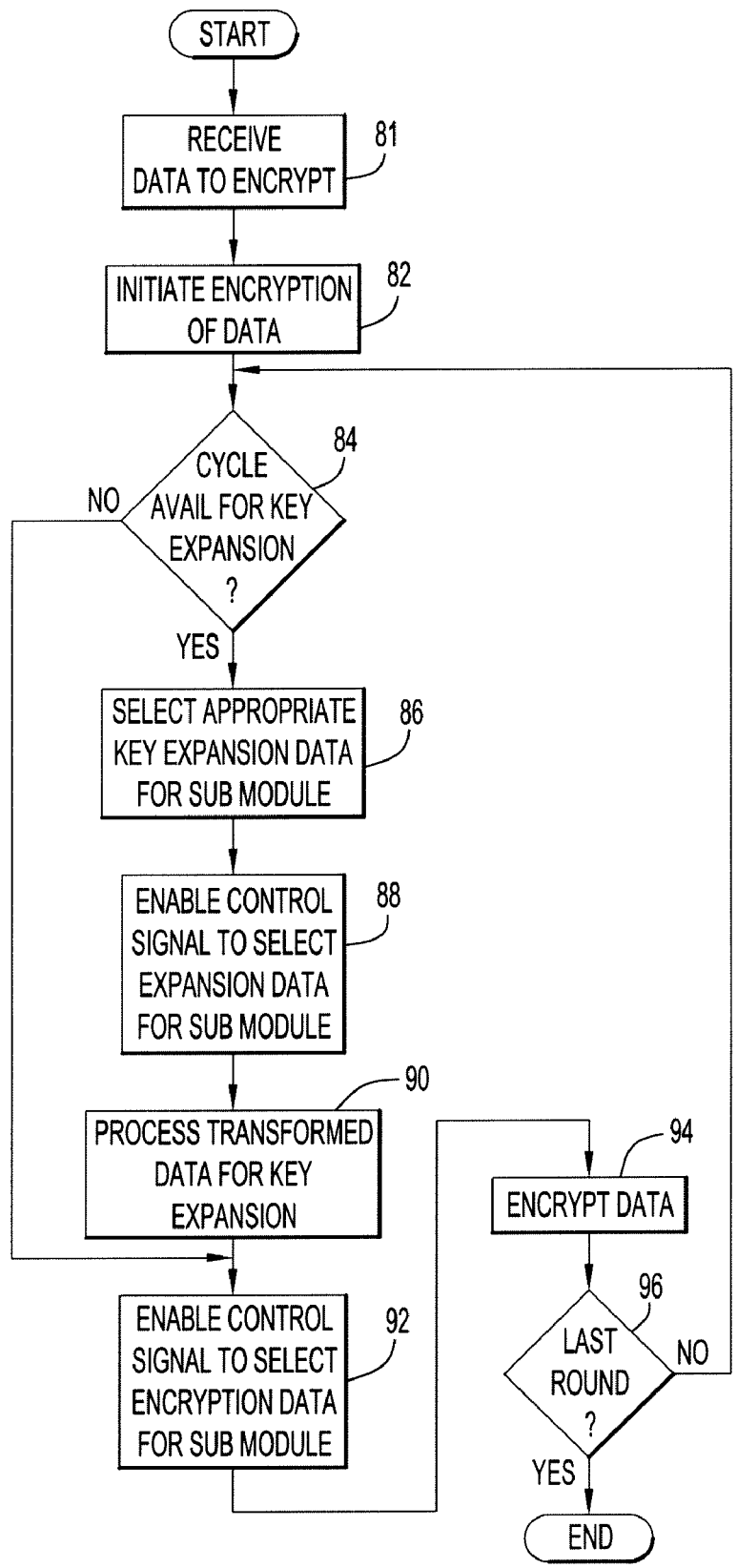
FIG. 6 is a procedural flowchart illustrating the manner in which key expansion is performed within an encryption loop according to an embodiment of the present invention.

The manner in which encoder 50 performs encryption and key expansion is illustrated in FIG. 6. Specifically, plaintext or input data (e.g., PT DATA as viewed in FIG. 3) is provided to multiplexer module 1 (FIG. 3) at step 81, and encryption loop 70 is initiated at step 82 to encrypt the data in substantially the same manner described above. Control signal module 66 determines the presence of an available clock cycle during the encryption loop for key expansion based on cycle counter 64 as described above. When a clock cycle is unavailable for key expansion as determined at step 84, control signal module 66 enables a control signal for encode multiplexer module 54 at step 92 to provide encryption data to substitution module 56 to perform encryption as described above.

However, once a clock cycle becomes available during the encryption loop for key expansion as determined at step 84, key expand module 58 selects the appropriate key material (e.g., Tables I-VI) for the substitution module at step 86 to perform key expansion in key expansion loop 80. This selection is based on the quantity of bits in the key utilized for the application as described above. Control signal module 66 enables a control signal for encode multiplexer module 54 at step 88 to provide key expansion data to substitution module 56 to perform key expansion as described above. The data received from the substitution module is processed at step 90 by key expand module 58 as described above. Control signal module 66 enables a control signal for encode multiplexer module 54 at step 92 to provide encryption data to substitution module 56, and the encryption loop is resumed at step 94.

The encryption and key expansion are repeatedly performed in this manner until the final round is processed as determined at step 96.

It will be appreciated that the embodiments described above and illustrated in the drawings represent only a few of the many ways of implementing a method and apparatus for key expansion to encode data.

Encoder 50 may be implemented by one or more hardware modules or units (e.g., logic circuits, Field Programmable Gate Array (FPGA), ASIC, circuitry, etc.), or a combination of hardware and software modules or units. The modules of encoder 50 (e.g., multiplexer module, logic module, shift module, mix module, key expansion module, encode multiplexer module, substitution module, etc.) may be implemented by any types of hardware or circuit modules including any types of analog or digital circuitry (e.g., gates, transistors, integrated circuits, resistive, inductive and/or capacitive elements, FPGA, ASIC, etc.).

Alternatively, the functions of the encoder modules may be implemented by software modules or units for execution on a processor. It is to be understood that the software modules may be implemented in any desired computer language and could be developed by one of ordinary skill in the computer arts based on the functional descriptions contained in the specification and flow chart illustrated in the drawings. Further, any references herein of software performing various functions generally refer to computer systems or processors performing those functions under software control. The various functions of the encoder modules may be distributed in any manner among any quantity of hardware or software modules or units. The functions of the modules described above and illustrated in the flow chart may be modified in any manner that accomplishes the functions described herein. In addition, the functions in the flow chart or description may be performed in any order that accomplishes a desired operation.

The software modules may further be available on a program product apparatus or device including a recordable or computer usable medium (e.g., magnetic or optical mediums, magneto-optic mediums, floppy diskettes, CD-ROM, DVD, memory devices, etc.) for use on stand-alone systems or systems connected by a network or other communications medium, and/or may be downloaded (e.g., in the form of carrier waves, packets, etc.) to systems via a network or other communications medium.

Encoder 50 may be implemented by any suitable devices (e.g., IC or chip, FPGA, ASIC, etc.), and may be configured for any suitable encoding or encryption scheme. The data may be received by encoder 50 and processed by the encoder modules in data blocks or words of any suitable lengths. The input data may include any desired information for encoding or encryption (e.g., text, characters, symbols, etc.). The encryption or encoding key may be expanded by any suitable expansion scheme, where the key may include any desired length. The encoding or encrypting scheme may employ any suitable quantity of rounds for the encoding and/or key expansion.

The multiplexer modules of encoder 50 (e.g., multiplexer module 1, key multiplexer module 22, data multiplexer module 34, encode multiplexer module 54, etc.) may be implemented by any quantity of any conventional or other multiplexing or switching device, and may select from any desired quantity of data based on any suitable control signals. The logic modules of encoder 50 (e.g., logic module 14, key logic module 30, expansion logic module 36, etc.) may be implemented by any quantity of conventional or other logic gates or circuitry performing any suitable logic or arithmetic operations (e.g., AND, OR, NAND, NOR, XOR, XNOR, addition, multiplication, division, shift, etc.). The shift module of encoder 50 may be implemented by any quantity of any conventional or other shifting devices (e.g., shift or other registers, wires, etc.), and may shift any quantity of data in any suitable manner (e.g., left, right, logical shift, cyclical shift, etc.). The mix module of encoder 50 may be implemented by any quantity of any conventional arithmetic or logic devices to apply any suitable functions or constants (e.g., polynomial functions, etc.) to any quantity of data in any desired fashion (e.g., AND, OR, NAND, NOR, XOR, XNOR, addition, multiplication, division, shift, etc.).

The substitution module of encoder 50 may be implemented by any quantity of any conventional data swapping device, and may utilize any quantity of any types of storage structures to provide alternative data (e.g., look-up or other tables, array, list, queue, stack, etc.). The substitution module may store and substitute any quantity of any desired data.

The controller module of encoder 50 may employ any conventional or other control schemes, may perform any suitable functions (e.g., selection and scheduling of key expansion data, etc.), and provide any suitable controls or control signals (e.g., digital or analog signals, etc.) for the encryption and key expansion loops to perform the encryption and key expansion. The control signal module of encoder 50 may be implemented by any conventional or other signal generator, and may generate any suitable controls or control signals (e.g., digital or analog signals, etc.) for the multiplexer or other modules of the encryption and key expansion loops to perform the encryption and key expansion. The signal generation and control functions may be distributed in any manner between the controller and control signal modules. The controller module may reside external of the key expansion module within encoder 50 (e.g., a separate control module or unit) to control the encryption and key expansion functions or, alternatively, separate control modules may be utilized within encoder 50 to respectively control the encryption and key expansion functions.

The key expand module may receive the key length in any suitable manner (e.g., parameter setting, user input, determined from provided key, etc.). The key expand module may implement any suitable key expansion scheme and may employ keys of any suitable length. The key expand module may further dynamically determine the proper data for the key expansion and schedule the data within the encryption loop based on the length of an applied encryption key and/or any desired information or conditions (e.g., round and/or cycle counts, etc.). The key expansion data may be injected within the encryption loop any quantity of times at any suitable time intervals prior to use of the processed data. The timing may be based on any desired quantity of the round and/or cycle counts and/or any desired information or conditions (e.g., available cycles of the encryption loop, etc.). Any modules of the encryption loop may similarly be utilized for key expansion or other purposes during encryption or encoding to enhance throughput and reduce logic needed by encoder 50. The round and cycle counters may be implemented by any quantity of any conventional or other counters, may be incremented or decremented by any suitable values to maintain counts, and may be initialized to any suitable values. These counters may further wrap around (e.g., modulus type counters, etc.) relative to any desired values.

The delay module of encoder 50 may be implemented by any quantity of any conventional delay or storage device (e.g., register, queue, stack, buffer, list, etc.), and may store any quantity of prior key or other values. The rotate module of encoder 50 may be implemented by any quantity of any conventional or other shifting or rotating devices (e.g., shift or other registers, etc.), and may shift or rotate any quantity of data in any suitable manner (e.g., left, right, logical shift, cyclical shift, etc.). The constant module of encoder 50 may be implemented by any quantity of any conventional arithmetic or logic devices to apply any suitable functions or constants (e.g., round or other constants, etc.) to any quantity of data in any desired fashion (e.g., AND, OR, NAND, NOR, XOR, XNOR, addition, multiplication, division, shift, etc.).

The banks or pipeline stages of encoder 50 may include any quantity of any conventional or other memory elements (e.g., flip-flops, gates, etc.) each of any desired storage capacity. Any quantity of banks may be disposed for any of the modules at any suitable locations to provide storage and/or proper timing. The modules of encoder 50 may be controlled in any fashion to enable, disable or bypass processing of data by those modules for any desired iterations of a round.

The present invention may preferably be used in any ASIC or FPGA application that requires a hardware AES solution, including commercial and military communication systems. However, the present invention is not limited to the applications described above, and may be used for any encoding or encryption scheme in any hardware application that requires a hardware solution.

From the foregoing description, it will be appreciated that the invention makes available a novel method and apparatus for key expansion to encode data, wherein an encryption key is expanded by using logic and available clock cycles of an encryption loop.

Having described preferred embodiments of a new and improved method and apparatus for key expansion to encode data, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:
1. An encoder comprising:
an encode circuit module to encode data based on an encoding key and in accordance with an encoding scheme, wherein said encode circuit module includes:
an encode processing circuit module to process said data to facilitate said encoding and including:
a substitution circuit module to substitute received data with data from a storage unit and produce substituted data for said encoding scheme;
a plurality of memory units to form pipeline stages with clock delays that provide available cycles during said encoding;
a key expansion circuit module to receive and expand said encoding key and provide portions of said expanded encoding key to said encode circuit module to encode said data, wherein said key expansion circuit module includes:
a controller to dynamically determine portions of said expanded encoding key to utilize for generating subsequent expansions of said encoding key based on a length of said encoding key, and to determine occurrence of said available cycles during said encoding and provide said determined portions to said encode processing circuit module during said available cycles of said encoding to access said substitution circuit module and facilitate generation of said subsequent expansions.

2. The encoder of claim 1, wherein said encode circuit module further includes:
a first switching device coupled to said key expansion circuit module to select and provide to said encode processing circuit module one of data generated by said encode circuit module during said encoding and said determined portions.

3. The encoder of claim 2, wherein said controller includes:
a control signal circuit module to generate controls for said first switching device to select and provide said determined portions to said encode processing circuit module during said available cycles.

4. The encoder of claim 3, wherein said encoding includes a series of rounds each including a plurality of cycles, and said encoder further includes a round counter to maintain a round count of a quantity of rounds and a cycle counter to maintain a cycle count of a quantity of cycles within each round, and wherein said control signal circuit module generates said controls in accordance with at least one of said round count and said cycle count.

5. The encoder of claim 1, wherein said encoding scheme includes an Advanced Encryption Standard (AES) scheme.

6. The encoder of claim 2, wherein said encode circuit module further includes:
a shift circuit module to shift said substituted data from said substitution circuit module and produce shifted data;
a mix circuit module to selectively apply a function to said shifted data and produce resulting data for an encoding round;
a second switching device to select one of said shifted data, input data and said resulting data; and
a logic circuit module to receive said portions of said expanded key from said key expansion circuit module, apply said received expanded key portions to said selected data from said second switching device to produce keyed data, and provide said keyed data to said first switching device, wherein said keyed data serves as said encoded data in response to a final encoding round.

7. The encoder of claim 1, wherein said key expansion circuit module further includes:
a second switching device to select one of said encoding key and data generated by said key expansion circuit module for said key expansion, wherein said selected data serves as said expanded encoding key portion;
a storage unit to store said selected data from said second switching device;
a rotate circuit module to selectively rotate said selected data from said second switching device, wherein produced data is provided to said substitution circuit module;
a constant circuit module to provide data relating to constants;
a first logic circuit module to receive said substituted data from said substitution circuit module and to selectively apply said constants data to said substituted data to produce resulting expansion data;
a third switching device to select at least one of said substituted data, said resulting expansion data and data from said storage unit; and
a second logic circuit module to combine said stored data with said data selected by said third switching device and provide said combined data to said second switching device.

8. The encoder of claim 1, wherein said encoding scheme includes an Advanced Encryption Standard (AES) scheme, and said encoding key includes a length of one of 128 bits, 192 bits and 256 bits.

9. The encoder of claim 1, wherein said encoder is implemented on one of a Field Programmable Gate Array (FPGA) and an Application Specific Integrated Circuit (ASIC).

10. The encoder of claim 1, wherein said controller dynamically accommodates at least two different lengths for said encoding key and determines portions of said expanded encoding key to utilize for generating subsequent expansions of said encoding key based on a selected one of said lengths.

11. A method of encoding data within an encoder including a key expansion circuit module to expand an encoding key, and an encode circuit module with an encode processing circuit module to process said data to facilitate said encoding, said method comprising:
(a) encoding said data based on said encoding key and in accordance with an encoding scheme via said encode circuit module, wherein step (a) further includes:
(a.1) substituting received data with data from a storage unit and producing substituted data for said encoding scheme via a substitution circuit module of said encode processing circuit module; and
(a.2) forming pipeline stages with clock delays that provide available cycles during said encoding via a plurality of memory units;
(b) expanding said encoding key via said key expansion circuit module and providing portions of said expanded encoding key to said encode circuit module to encode said data, wherein step (b) further includes:
(b.1) dynamically determining portions of said expanded encoding key to utilize for generating subsequent expansions of said encoding key based on a length of said encoding key; and
(b.2) determining occurrence of said available cycles during said encoding and providing said determined portions to said encode processing circuit module during said available cycles of said encoding to access said substitution circuit module and facilitate generation of said subsequent expansions.

12. The method of claim 11, wherein step (b.2) further includes:
(b.2.1) selecting and providing to said encode processing circuit module one of data generated by said encode circuit module during said encoding and said determined portions.

13. The method of claim 12, wherein step (b.2.1) further includes:
(b.2.1.1) generating controls to select and provide said determined portions to said encode processing circuit module during said available cycles.

14. The method of claim 13, wherein said encoding includes a series of rounds each including a plurality of cycles, and step (a) further includes:
maintaining a round count of a quantity of rounds; and
maintaining a cycle count of a quantity of cycles within each round; and
step (b.2.1.1) further includes:
(b.2.1.1.1) generating said controls in accordance with at least one of said round count and said cycle count.

15. The method of claim 11, wherein said encoding scheme includes an Advanced Encryption Standard (AES) scheme.

16. The method of claim 12, wherein step (a) further includes:
shifting said substituted data and producing shifted data;
selectively applying a function to said shifted data and producing resulting data for an encoding round;
selecting one of said shifted data, input data and said resulting data; and applying expanded key portions to said selected data to produce keyed data, and providing said keyed data for selection in step (b.2.1), wherein said keyed data serves as said encoded data in response to a final encoding round.

17. The method of claim 11, wherein step (b) further includes:
- (b.3) selecting one of said encoding key and data generated for said key expansion, wherein said selected data serves as said expanded encoding key portion;
- (b.4) storing and selectively rotating said selected data from step (b.3) and providing said selectively rotated data to said encode processing circuit module for said substitution;
- (b.5) selectively applying constants data to said substituted data to produce resulting expansion data;
- (b.6) selecting at least one of said substituted data, said resulting expansion data and said stored data; and
- (b.7) combining said stored data with said selected data from step (b.6) and providing said combined data for selection in step (b.3).

18. The method of claim 11, wherein said encoding scheme includes an Advanced Encryption Standard (AES) scheme, and said encoding key includes a length of one of 128 bits, 192 bits and 256 bits.

19. The method of claim 11, wherein said encoder is implemented on one of a Field Programmable Gate Array (FPGA) and an Application Specific Integrated Circuit (ASIC).

20. The method of claim 11, wherein step (b.1) further includes:
- (b.1.1) dynamically accommodating at least two different lengths for said encoding key and determining portions of said expanded encoding key to utilize for generating subsequent expansions of said encoding key based on a selected one of said lengths.

* * * * *

UNITED STATES PATENT AND TRADEMARK OFFICE
CERTIFICATE OF CORRECTION

PATENT NO.        : 8,238,557 B2
APPLICATION NO.   : 12/335837
DATED             : August 7, 2012
INVENTOR(S)       : Bruce Reidenbach It is certified that error appears in the above-identified patent and that said Letters Patent is hereby corrected as shown below:

In the Specifications:

Column 2, line 52, replace "module 1" with -- module 11 --; and
Column 2, line 63, replace "module 1" with -- module 11 --.

Column 3, line 2, replace "module 1" with -- module 11 --; and
Column 3, line 10, replace "module 1" with -- module 11 --.

Column 5, line 37, replace "module 1" with -- module 11 --; and
Column 5, line 56, replace "module 1" with -- module 11 --.

Column 6, line 3, replace "module 1" with -- module 11 --;
Column 6, line 9, replace "module 1" with -- module 11 --;
Column 6, line 17, replace "module 1" with -- module 11 --; and
Column 6, lines 62 - 63, replace "module 1" with -- module 11 --.

Column 7, line 3, replace "module 1" with -- module 11 --.

Column 15, line 45, replace "module 1" with -- module 11 --.

Column 16, line 60, replace "module 1" with -- module 11 --.

Signed and Sealed this
Twenty-fifth Day of December, 2012

David J. Kappos
*Director of the United States Patent and Trademark Office*